Dec. 6, 1960  R. W. KEBLER ET AL  2,962,838
METHOD FOR MAKING SYNTHETIC UNICRYSTALLINE BODIES
Filed May 20, 1957 sapphire lens blank

INVENTORS
RICHARD W. KEBLER
ELMER E. DUTCHESS
RALPH L. HUTCHESON
BY Thomas J. O'Brien
ATTORNEY

2,962,838
METHOD FOR MAKING SYNTHETIC UNICRYSTALLINE BODIES

Richard W. Kebler, Indianapolis, Ind., Elmer E. Dutchess, Buffalo, N.Y., and Ralph L. Hutcheson, Indianapolis, Ind., assignors to Union Carbide Corporation, a corporation of New York Filed May 20, 1957, Ser. No. 660,414

10 Claims. (Cl. 49—77)

This invention concerns improved synthetic unicrystalline bodies, for example, unicrystalline corundum bodies, and improved methods for making such bodies. More particularly, it concerns a process for producing as-grown axially symmetrical concave-convex unicrystalline bodies.

Sapphire or corundum and other gem materials possess certain properties which render them especially valuable for many purposes in addition to their value for ornamentation. Sapphire is especially suited for use in infrared systems since it is chemically stable and capable of transmitting infra-red radiation over at least the infra-red wave length range of photo-conductive type detectors (approximately over wave lengths of 1 to 6 microns). A need exists, in addition, for windows in such systems which have an aerodynamically stream-lined shape and yet are mechanically strong. While curve shaped bodies could be fabricated from conventional Verneuil type boules, there is considerable waste in the process of cutting the boules, and conventional boules have not been grown successfully heretofore in large enough diameters to provide for the existing need.

Synthetic sapphire and other materials, such as rutile and spinel, are generally produced as boules grown by fusing and accumulating an appropriate material on a support which underlies an oxy-hydrogen flame and is progressively moved away from such flame as the boule grows in order to maintain a proper relationship between the upper surface of the boule and the flame. As obtained by this process, which is well-known as the Verneuil process, the boule is generally cylindrical in form and usually not more than one inch in diameter. Although boules may be grown in this manner which approach or even somewhat exceed one inch, such boules rupture during shutdown of the furnace and are rendered unfit for the fabrication of large diameter bodies. Such rupture is believed to result from the superposition of the thermal stresses undergone during cooling upon the stresses resulting from the thermal gradients in the boule during growth. The larger the boule diameter, the greater the combined stresses. Consequently, synthetic unicrystalline bodies heretofore available commonly had to be cut from these small diameter boules and did not exceed about ⅞" in diameter.

The principal object of this invention is, therefore, to provide an improvement on the Verneuil process for growing axially symmetrical concave-convex boules from which streamlined or hemisphere-shaped windows can be efficiently fabricated. According to the present invention, powdered constituents of a unicrystalline body to be formed are passed through an oxy-hydrogen flame to fuse the constituents. The fused constituents are accumulated and crystallized on a crystal seed preferably in rod form, which underlies the flame, and which also preferably has compatible lattice parameters and the same crystal structure as the crystal to be formed. In one form of the present invention the crystal seed is rotated about its longitudinal axis which is disposed at an oblique angle relative to the axis or direction of the flame, so as to form a radially enlarged crystal of increasing diameter as molten boule material is dropped onto it. The seed crystal or rod can be disposed at either an acute or obtuse angle relative to the flame axis. However, it is preferred in this form of the invention that the seed rod be at an obtuse angle of the flame axis, i.e., tilted above the horizontal axis so as to minimize "necking" (melting of the seed rod behind the boule by the burner flame). Growing a boule in the preferred manner also has the advantage that by growing from the upper end of the rod the original seed rod does not pass completely through the center of the as-grown piece and inclusions which may be formed during the growth start can be removed from the as-grown piece during fabrication. Depending upon the growth conditions and furnace configuration the distance between the flame and the point of deposition on the growth surface may be held relatively constant or may be varied. This distance can be held relatively constant by lowering the seed support to compensate for boule growth. In contrast to this, the support need not be lowered and the above distance would decrease as the boule grows. This latter condition is possible only under proper furnace design and operating conditions. The speed of rotation must be sufficiently fast to bring each point of the outer edge of the boule back under the flame while it is still molten. Also the rotation speed must not be so fast that centrifugal force distorts the boule. The resulting boule will have approximately an axially symmetrical concave-convex shape. Rotation of the seed rod also aids in symmetrical distribution of heat about the axis of rotation and minimizes temperature gradients across the boule during growth thereby avoiding severe internal stresses which would otherwise tend to crack larger size crystals grown by previous methods.

The principles of this invention will be described in detail hereinafter with reference to the accompanying drawings wherein.

Figure 1:
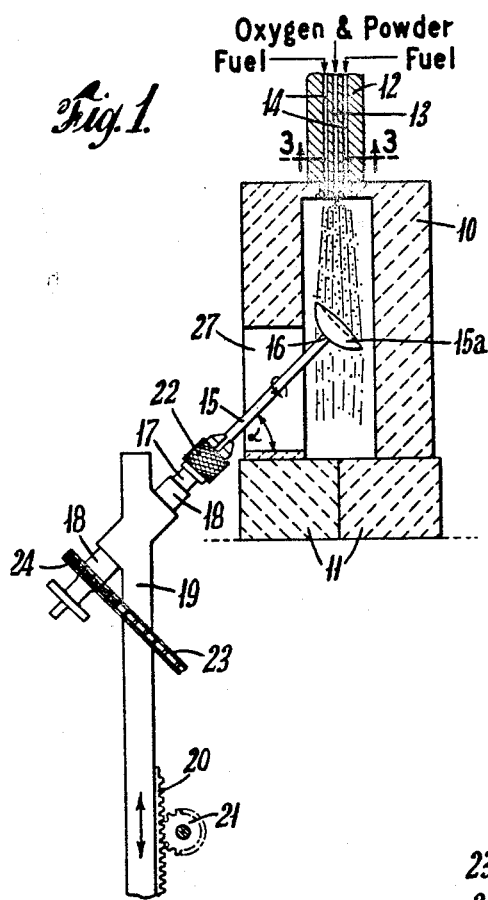
Fig. 1 is a schematic view of apparatus for carrying out the process of the present invention.
Figure 2:
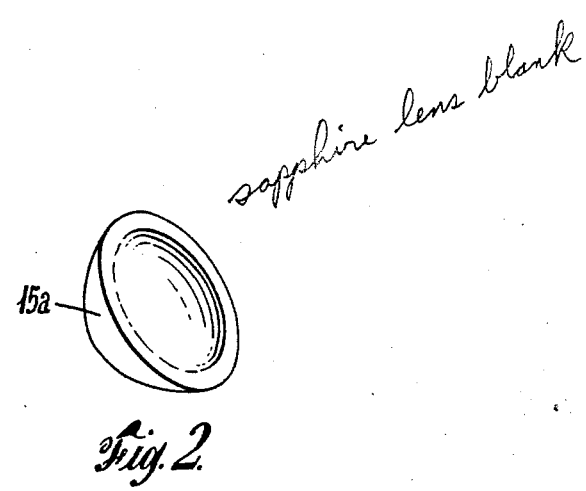
Fig. 2 is a perspective view of a crystal as grown by the present process.
Figure 3:
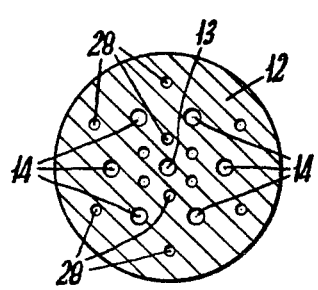
Fig. 3 is a cross-section view of the burner 12 taken along line 3—3.

With reference now to Figure 1 of the drawings, there is shown a small furnace 10 of heat-resistant material, which rests on blocks 11 of like material that close the lower end of the furnace. An opening in the upper end of the furnace receives the nozzle end of an oxy-hydrogen burner 12. The burner 12 is of the type known in the art as a "tri-cone" burner. Oxygen is supplied continuously through central passage 13, and powdered material, such as crystallizable corundum powder, for example, is delivered in known manner through passage 13 by the oxygen stream. Fuel gas, such as hydrogen, is delivered to the nozzle end of burner 12 through a plurality of passages 14 surrounding central passage 13. Additional oxygen is delivered through passages 28 surrounding the fuel passages 14. The oxygen and hydrogen mix together outside the burner and upon ignition form an intensely hot downwardly directed flame which melts the powder passing therethrough.

In accordance with the principles of this invention, a crystal seed 15, preferably in the form of a rod as shown, is mounted for rotation about its longitudinal axis which is at an oblique angle to the direction of the flame. It is mounted so that its free end extends through an opening 27 in the side wall of furnace 10 with its inner end 16 disposed in a position underlying the flame emanating from burner 12, the seed rod holder assembly being movably vertical so that as the diameter of the boule increases, the rod may be moved progressively downward to maintain a proper distance between the outer edge of the boule and the burner nozzle. Conversely, it can be readily seen that the burner may be moved relative to the seed rod, and that any relative movement of the two elements may be made to effect any desired relationship. Seed rod holder assembly comprises a hollow shaft 17 supported in a vertically movable guide or bearing housing 18 which may be supported, for example, on an upright 19 that has a rack 20 secured thereto which is driven by a pinion 21. The seed rod 15 extends through the hollow shaft 17 in a chuck 22 which is fixed to the shaft and receives and grips the rod and fixes the latter relative to the shaft so that it is rotated therewith. Shaft 17 is driven by a power-operated chain 23 which passes over a sprocket 24 fixed on the shaft.

After an initial period of operation during which the flame is used only to fuse the surface of the seed rod, the powder feed is started. The powder dropping from the flame melts and accumulates in molten condition on the seed crystal and crystallizes progressively as the operation is continued. Rotation of the inclined seed rod causes an axially symmetrical concave-convex boule crystal 15a to be formed. As the boule grows radially outwardly from the seed rod, the latter may be lowered to compensate for such growth in order to maintain a proper relationship between the molten edge of the crystal where deposition occurs and the flame. With proper furnace design to maintain desired growing conditions, the growing boule need not be lowered. The grown boules are subsequently annealed by slow heating to about 1900° C. in a gas-fired furnace. The boule is held at this temperature for several hours and is then slowly cooled.

In making boules in this manner, it has been found necessary to maintain the rotational speed of the seed rod above a limiting rate. For example, the seed rod should be rotated at a rate greater than 60 r.p.m. and preferably at about 135 r.p.m. It appears that elevated rotational speeds are necessary in growing enlarged diameter boules so that the molten layer on the outer periphery of the boule will not solidify during the time it is not directly under the flame. The boule should not be rotated too rapidly or centrifugal forces acting on the molten surface will cause an eccentric or non-symmetrical shaped boule to form. A rotational speed of about 250 r.p.m. appears to be the upper limit.

The shape of the boule can be controlled by varying the angle of inclination of the seed rod. It has been found that the greater the angle of inclination, the smaller is the included angle of the resulting boule. In accordance with the present invention the angle of inclination between the supported end of the seed rod and the horizontal can vary from about 10° to about 75° measured upwardly from the horizontal and from about 10° to about 60° measured downwardly from the horizontal. The angle of inclination is shown as "α" in Fig. 1. The limitations on the angle of inclination are largely imposed by the temperature equilibration necessary to produce satisfactory boules. It is desirable to maintain minimum temperature gradients across the diameter of the growing boule in order to reduce thermal stresses therein. In growing boules with the seed rod inclined upwardly from the horizontal, hot gas flow passing by the rim where growth occurs impinges near the central section of the boule. Thus, the central section of the boule is supplied with heat and rotation of the boule insures symmetrical heat distribution about the circumference thereof, thus minimizing the cooling of the portion away from the flame at any one time. When the angle of up-inclination exceeds about 75°, the side of the boule opposite from the flame is no longer so directly impinged upon by hot gases and consequently tends to be relatively cool. This introduces thermal stresses which tend to cause cracking of the material upon cooling.

It has been found that hemispherical-shaped boules can be grown by adjusting the angle of inclination to approximately 45° either up or down from the horizontal. From these boules, hollow hemispheres can be easily fabricated with a minimum of grinding and a minimum of waste.

Control of the boule size and shape may also be accomplished by translation of the inclined seed rod axially, sideways, up and down or any combinations thereof. The advantages of using these motions would be to grow the boule in a shape approximating the desired shape of the finished piece. The angle of inclination of the seed rod can also be varied during growth in order to impart different curve surfaces to different regions of the boule. It has also been found that better boules can be grown by slightly varying the angle of inclination of the seed rod during growth to compensate for changes in growth coditions as the boule enlarges. For example, when growing hemispherical-shaped boules, it has been found that the seed rod should not be fixed at exactly 45° during the entire growing period, but should be varied slightly to compensate for lowering of the seed rod during growth, chamber shape and growth procedures.

The following example serves to illustrate an application of the present invention:

EXAMPLE I

*Growth of axially symmetrical concave-convex shaped sapphire boule*

An oxygen-hydrogen burner of the type known as a "tri-cone" burner for growing crystalline boules was used for this process. This burner consisted of oxygen and hydrogen gas ports surrounding an oxygen port through which boule powder was dropped. A ¼" diameter sapphire seed rod having a crystal orientation with the optic axis 60° from the physical axis was positioned below the burner outlet at an angle of 45° above the horizontal. It was located so that the tip of the seed rod was the first portion of the seed rod to melt. The growth zone was surrounded by two 2" I.D. furnace bricks chopped out to accommodate the growing boule. The seed rod was then rotated at about 135 r.p.m. throughout the growing process. The burner was ignited and the gas streams set at 5 p.s.i. upstream pressure for hydrogen (No. 66 orifice in the line), 5 p.s.i. upstream pressure for outer oxygen (No. 66 orifice in line), and 5 p.s.i. upstream pressure for inner oxygen (No. 72 orifice in line with No. 35 insert at outlet). The bricks were closed about the growth zone and the seed rod was allowed to warm for 2 min. The hydrogen and outer oxygen pressures were then gradually and simultaneously increased to 18 p.s.i. and 15 p.s.i. respectively, and the seed was allowed to warm for two additional min. during which time the tip of the seed rod became molten. Over a 30 second period the inner oxygen was increased to 15 p.s.i. and the powder feed started. The powder feed was adjusted so that the average boule growth rate was about 100–150 carats per hour. Over a ten second period the inner oxygen pressure was increased to 16 p.s.i. and then increased in increments of 1 p.s.i. approximately every 10 minutes until 26 p.s.i. was reached. Growth was then continued until a boule 2 5/16 in. in maximum diameter was obtained having a weight of 710 carats. The powder feed was stopped, the gas flow suddenly shut off, and the seed rotation stopped. The as-grown boule was then allowed to cool in the growth furnace for at least 45 min.

The experimental work thus far with this form of the invention has used principally seed rods having a crystal orientation with the optic axis 0° or 60° from the physical axis of the rod. 0° orientated seed rod offers the advantage that the mechanical axis of symmetry of the boule would also coincide with the optical axis of symmetry. This later orientation may be advantageous in optical applications.

Figure 4:
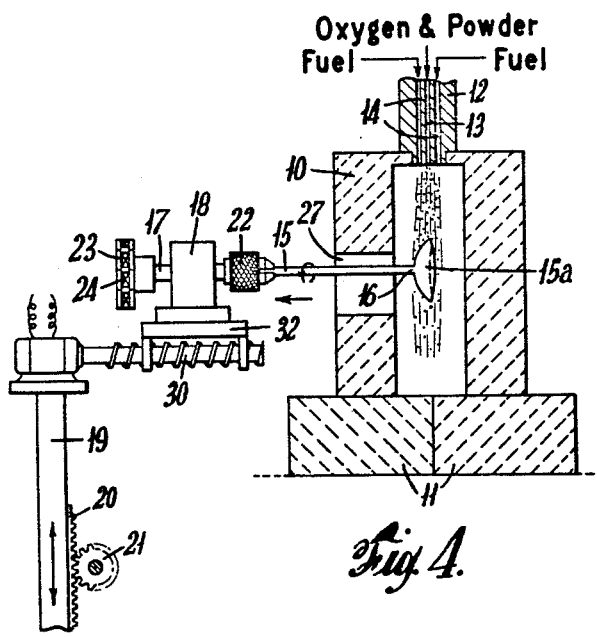
Fig. 4 is a schematic view of apparatus for carrying out a modification of the process of the present invention.

Another form of the invention has also been used to grow axially symmetrical unicrystalline boules which more nearly approach the finished shape of a hollow hemisphere. This method is to employ a horizontally positioned rotating seed rod and to axially translate the seed rod during growth. This set-up is shown in Fig. 4. The equipment used for this form of the invention is substantially the same as that of Fig. 1 with the exception that means (screw feed 30) are specifically provided to drive the carriage 32 supporting the bearing housing 18 for axially translating the seed rod during growth.

In order to grow an axially symmetrical concave-convex boule in which the seed rod does not extend through the boule, the seed rod is preferably withdrawn from the growth zone. It is apparent, however, that a similar shape wherein the seed rod extends through the center of the boule could be grown by translating the seed rod in the opposite direction.

The limits on seed rod rotation are the same as described above for the inclined rod form of the invention.

The following example serves to illustrate this other form of the present invention.

EXAMPLE II

*Growth of an axially symmetrical concave-convex shaped sapphire boule*

A burner of the type described in Example I above was used for this process. A ¼" diameter sapphire seed rod having a crystal orientation with the optic axis coincident with the physical axis (0° orientation) was horizontally positioned below the burner outlet. It was located so that the tip of the seed rod was the first portion of the seed rod to melt. The growth zone was surrounded by a 4" I.D. chamber cut to fit a hemisphere-shaped boule. The seed rod was then rotated at about 115 r.p.m. throughout the growing process. The burner was ignited, and the gas streams set at 2–3 p.s.i. upstream pressure for hydrogen (No. 58 orifice in the line), 2–3 p.s.i. upstream pressure for outer oxygen (No. 59 orifice in the line), and 1 p.s.i. upstream pressure for inner oxygen (No. 70 orifice in the line with No. 35 insert at the outlet). The bricks were closed about the growth zone and the seed rod was allowed to warm for 2 min. The hydrogen and outer oxygen pressures were then gradually and simultaneously increased to 16 and 22 p.s.i. respectively. The inner oxygen was increased until the seed rod became molten, and this condition was maintained for about 2 min. The inner oxygen was increased 2 p.s.i. and powder feed started. The seed rod pulling mechanism was started and the seed rod was withdrawn during growth at 0.36 inch per hour. Growth was continued until a boule of desired size was obtained. The powder feed was stopped, the gas flows suddenly shut off, and the seed rotation and translation stopped. The as-grown boule was then allowed to cool in the growth furnace for at least 2 hrs. before the furnace was opened. The resulting boule was 2⅞" internal diameter, 1" deep, 1⅝" external radius and weighed 830 carats. This 0° oriented boule will be useful for optical applications.

The combination of inclining and translation of the rotating seed rod can also be used to grow modified concave-convex shapes as well as boules having increased included angles.

The methods of this invention are applicable to other materials where elongated seed rods can be grown or where a seed crystal can be held on the end of a rotating rod of different material. For example, such materials as rutile and spinel may be grown by the method of this invention. The subject process is also not limited to the use of oxygen-hydrogen burner flames, but also could use an arc torch.

What is claimed is:

1. A process for growing a synthetic uni-crystalline body which comprises passing powdered constituent material through a heat source to fuse the same; directing said heat source toward a seed crystal disposed on an axis inclined at an oblique angle to the axis of the heat source for depositing fused material and building up such material by crystallization on said seed crystal; rotating said seed crystal about its geometric axis to grow an axially symmetrical concave-convex crystal of increasing diameter.

2. A process as defined in claim 1 wherein said seed crystal has a crystal structure which is the same as the grown material and lattice parameters compatible with those of the grown material.

3. A process as defined in claim 1 wherein said seed crystal is disposed at a 45° angle to the axis of the heat source.

4. A process for growing a synthetic unicrystalline body which comprises passing powdered constituent material through a heat source to fuse the same; directing said heat source toward a seed rod disposed at an oblique angle to the axis of the heat source for depositing fused material and building up such material by crystallization on the seed rod; rotating the seed rod about its geometric axis at a rate fast enough to bring each point on the outer edge of the crystal back under the heat source while it is still molten, so as to grow a radially outwardly enlarging axially symmetrical concavo-convex crystal.

5. A process as defined in claim 4 wherein said heat source is directed along a vertical axis and said seed rod is disposed at an angle thereto tilted downwardly from the horizontal at an angle in the range from about 10° to 60°.

6. A process as defined in claim 4 wherein said heat source is directed along a vertical axis and said seed rod is disposed at an angle thereto tilted upwardly from the horizontal at an angle in the range from about 10° to 75°.

7. A process as defined in claim 4 wherein said seed rod is rotated about its geometric axis at a speed of rotation not less than about 60 r.p.m.

8. A process for growing a synthetic unicrystalline body which comprises passing powdered constituent material through a heat source to fuse the same; directing said heat source toward a seed crystal disposed on an axis substantially normal to the heat source for depositing fused material and building up such material by crystallization on said seed crystal; rotating said seed crystal about said axis at a rate fast enough to bring each point on the outer edge of the crystal back under the heat source while it is still molten, so as to grow a radially outwardly enlarging crystal of increasing diameter; and progressively moving the seed crystal laterally in one direction only relative to the heat source to impart a concavo-convex crystal body.

9. A process for growing a synthetic unicrystalline body which comprises providing a heat source for fusing powdered constituent material, disposing a seed crystal of the constituent material transverse to the axis of the heat source; rotating said seed crystal about its geometric axis; passing powdered constituent material through said heat source for deposition in molten form on the seed crystal to grow a crystal of increasing diameter on said seed crystal and inclining the seed crystal obliquely to the axis of the heat source so as to impart a concavo-convex form to the crystal during growth.

10. A process for growing a synthetic unicrystalline body which comprises providing a heat source for fusing powdered constituent material, disposing a seed crystal of the constituent material transverse to the axis of the heat source; rotating said seed crystal about its geometric axis; passing powdered constituent material through said heat source for deposition in molten form on the seed crystal to grow a crystal of increasing diameter on said seed crystal and inclining the seed crystal obliquely to the axis of the heat source and also imparting a translating motion to the rotating seed crystal so as to impart modified concavo-convex shapes to the crystal during growth.

References Cited in the file of this patent
UNITED STATES PATENTS

| | | |
|---|---|---|
| 2,634,554 | Barnes | Apr. 14, 1953 |
| 2,703,296 | Teal | Mar. 1, 1955 |
| 2,852,890 | Drost | Sept. 23, 1958 |